(12) United States Patent
Pitcher

(10) Patent No.: US 6,721,398 B1
(45) Date of Patent: Apr. 13, 2004

(54) UNIFIED MESSAGING SYSTEM

(75) Inventor: John Pitcher, London (GB)

(73) Assignee: Virtuaplus Limited, London (GB)

( * ) Notice: Subject to any disclaimer, the term of this patent is extended or adjusted under 35 U.S.C. 154(b) by 0 days.

(21) Appl. No.: 09/344,761

(22) Filed: Jun. 25, 1999

(30) Foreign Application Priority Data

Jun. 25, 1998 (GB) ............................................ 9813766

(51) Int. Cl.[7] ............................ H04M 1/64; H04Q 7/20
(52) U.S. Cl. ................. 379/88.13; 379/67.1; 379/88.17; 379/88.18; 379/88.22; 379/88.25; 455/412
(58) Field of Search .................. 379/67.1, 88.04, 379/88.13, 88.17, 88.22, 88.23, 88.18, 88.25, 88.27, 908, 68, 88.19; 455/412, 413, 414, 445, 461

(56) References Cited

U.S. PATENT DOCUMENTS

| | | | | |
|---|---|---|---|---|
| 5,509,061 A | * | 4/1996 | Amereller et al. | 379/207 |
| 5,608,786 A | * | 3/1997 | Gordon | 379/100 |
| 5,623,538 A | * | 4/1997 | Petty | 379/67.1 |
| 5,675,507 A | * | 10/1997 | Bobo, II | 364/514 R |
| 5,742,905 A | * | 4/1998 | Pepe et al. | 455/461 |
| 5,751,792 A | * | 5/1998 | Chau et al. | 379/88.17 |
| 5,781,615 A | * | 7/1998 | Bales et al. | 379/88.18 |
| 5,915,001 A | * | 6/1999 | Uppaluru | 379/88.22 |
| 5,951,638 A | * | 9/1999 | Hoss et al. | 709/206 |
| 6,233,318 B1 | * | 5/2001 | Picard et al. | 379/88.17 |

FOREIGN PATENT DOCUMENTS

| | | |
|---|---|---|
| EP | 0 560 111 A2 | 9/1993 |
| EP | 0 760 573 A2 | 3/1997 |
| EP | 0 820 181 A2 | 1/1998 |

* cited by examiner

Primary Examiner—Allan Hoosain
(74) Attorney, Agent, or Firm—Harness, Dickey & Pierce, P.L.C.

(57) ABSTRACT

A unified messaging system, comprising a plurality of nodes (100a–100f) and network means (103) for interconnecting said plurality of nodes for distributed operation, each node comprising means for receiving, storing and transmitting data, characterized in that an In-box having a predetermined logical location is reserved for each user, and data intended for a particular user is stored at the node at which it is received together with information indicating the logical location of the In-box of the user for which the data is intended, wherein the system is arranged such that said data can be retrieved at one or more other nodes in the system and such that all data bearing said predetermined logical location information is accessed when said user's In-box is accessed.

17 Claims, 1 Drawing Sheet

UNIFIED MESSAGING SYSTEM

BACKGROUND OF THE INVENTION

The present invention relates to a unified messaging system.

A unified messaging system is defined as a system whereby all messages, for example voicemail, fax and e-mail etc., are presented within one central In-box location. These can be collected via various means and converted to the most appropriate format specified by the collector.

Existing unified messaging systems are singular systems which interface with a telephone switchboard and work as a single entity.

Such a system has evolved from PABX and telephone switchboard systems. The unified messaging components are added to the switchboard typically in a separate computer system. Telephone calls are initiated on telephone network, then pass through the switchboard PABX. From there calls are transferred to the computer system running the unified messaging system. An example of such a conventional system is shown in FIG. 1.

The system comprises a PBX/PABX unit 3 and a separate computer system 5. The PBX/PABX unit 3 is connected to the external telephone line 7 via the PSTN, public telephone network, and to the computer systems 5 via an internal connection 9. The computer system 5 has a network connection 11 for distribution of messages, for example, e-mail. On a functional level the above system operates as a single entity, i.e. there are no other distributed nodes to communicate with, the functionality, load processing, databases are concentrated on one system. It may be connected via the PSTN public phone network or via a computer based network (e.g. TCP/IP). These input/output connections operate in the bottom three layers of the OSI protocol model.

Such a system however, requires a switchboard and are then transferred to the computer system running the unified messaging system.

SUMMARY OF THE INVENTION

The unified messaging system of the present invention seeks to provide a messaging system in which the telephone lines and network connection go directly into the computer system which is running the unified messaging system.

In accordance with the present invention there is provided a unified messaging system, comprising a plurality of nodes and network means for interconnecting said plurality of nodes for distributed operation, each node comprising means for receiving, storing and transmitting data, characterized in that an In-box having a predetermined logical location is reserved for each user, and data intended for a particular user is stored at the node at which it is received together with information indicating the logical location of the In-box of the user for which the data is intended, wherein the system is arranged such that said data can be retrieved at one or more other nodes in the system and such that all data bearing said predetermined logical location information is accessed when said user's In-box is accessed.

At least one of the nodes may include means for changing the format of said data. For example, at least one of said plurality of nodes may include means for converting text data into speech data and/or at least one of said plurality of nodes may include character recognition means.

The nodes preferably have at least two input/output connections, an external network connection and an external telephone connection.

The data may comprise one or more of a voicemail message, fax message, e-mail message, web response message, phone answering message, short message service (SMS) message, notification message, system message, video-mail message, white board message.

The system is preferably arranged to provide a menu indicating data bearing the predetermined logical location information when a user's respective In-box is accessed. The menu may, for example, be a voice menu or it may be displayed on a screen in a textual format.

The system may be arranged such that data is retrieved from a first node and transmitted to a second node when said first node receives a signal from said second node upon instructions form a user. Additionally or alternatively, the system may be arranged such that data is transmitted from a first node to a second node at a predetermined time set by the system.

The nodes are preferably interconnected by means of an Internet-based network.

At least one of the plurality of nodes may comprise means for diverting incoming data to another one of the plurality of nodes, and such means may be automatic (i.e. activated when one of the nodes is busy) and/or user-activated (i.e. when, for example, the user travels).

In providing the unified messaging in a node-based distributed system, the unified message system can be built from an Internet type environment in which telephone components can be seamlessly integrated as just another form of data. The present invention allows for a rich feature set of distributed commands throughout the system. It is the node-to-node distribution of intelligence which is one of the primary significant features of the present invention.

The following table highlights the main differences and advantages of the present invention over the unified messaging system described with reference to FIG. 1:

| Traditional Unified Messaging System | An embodiment of the Unified Messaging System of the present invention |
|---|---|
| Works a single system Network Connection used for input and output of messages only | Nodes work together a distributed system Network Connections used for input and output of messages AND distributed operation and inter-node control |
| Requires Connection to a Telephone Switchboard or PABX for the input and output of phone based messages | The Phone Connection connects straight to the Node - no external telecom based piece of equipment is required |
| No Remote integrated message leaving options | A node can receive a message in a different location to the user. This message enters the common Unified Messaging distributed system. This capability allows for the "Virtual Branch Office" a phone number which can receive faxes, voicemail etc. which can be in a totally remote city (example, I am based in London but I have a Virtual Branch Office in Hong Kong - my callers in Hong Kong contact me via the local Hong Kong number - not an international call) |
| No Local Node Remote roaming | The Virtualplus user can then access any message from any of the Nodes (as they work together as one system) with the same interface. For example, a User has service with a London based Node. While on holiday in Los Angeles he can call the Los Angeles based node for the price of a local call to retrieve all his messages. |

-continued

| Traditional Unified Messaging System | An embodiment of the Unified Messaging System of the present invention |
|---|---|
| Typically integrates Voicemail, Fax and E-mail Message types | Integrates a rich feature set of Message Types. Any form of media which can be encapsulated within a computer file for example - Voicemail, Fax, E-mail, Video-Mail, White-Board Note |
| Has no Workgroup Features | Can have workgroup features such as Shared Calendars, To Do Lists, Shared Address Books, Meeting request tools and file sharing capabilities. These all integrate with the messaging components |
| Users often can only receive messages | Users can also initiate the sending of their own messages |

DESCRIPTION OF THE PREFERRED EMBODIMENTS

The system of the present invention is built from an Internet perspective and comprises an Internet centric distributed connection which mirrors the resilient and distributed nature of the design of the Internet. The system integrates telephone components seamlessly as just another form of data. This is possible due to the recent advances in computer telephony hardware which allow for phone calls to terminate in computer systems.

The unified messaging system of the present invention is a distributed system comprising a plurality of nodes 100*a–f* each naming data input/output connected together via the network 103 such that each node is functionally part of a larger system. Its functionality is performed on the multiple of nodes. The network communication between the nodes is not purely external communication such as e-mail or message passing such as in the lower levels of the traditional unified messaging system. The network communication is at all levels of the OSI model. For example, network communication is not confined to external communications, it is the actual internal system communication working in all 7 layers of the OSI model. The OSI 7 Lauer Protocol model is a standard mechanism for describing technical network and computer systems. It is ratified by the International Standards Organization. This Protocol is well known to persons skilled in the art and will not be described in detail here, but in brief it describes a common reference model of categorizing components of a system. Such a reference point is useful in describing the functionality of the unified messaging system of the present invention.

The model is hierarchical. The lower layers are the lower levels of a system, and are for lower level components such as electrical connections and basic network sessions. The higher levels of the system deal with the functionality of a system. For example, "System A—Process this system operation request while System B is busy".

Figure 1:
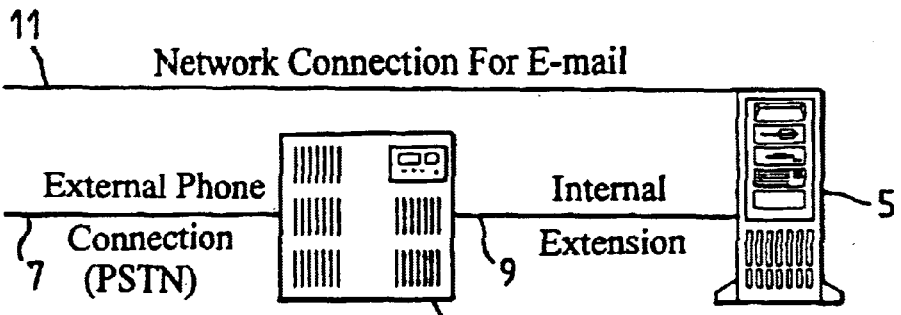
FIG. 1 is a schematic diagram of a conventional unified messaging system.
Figure 2:
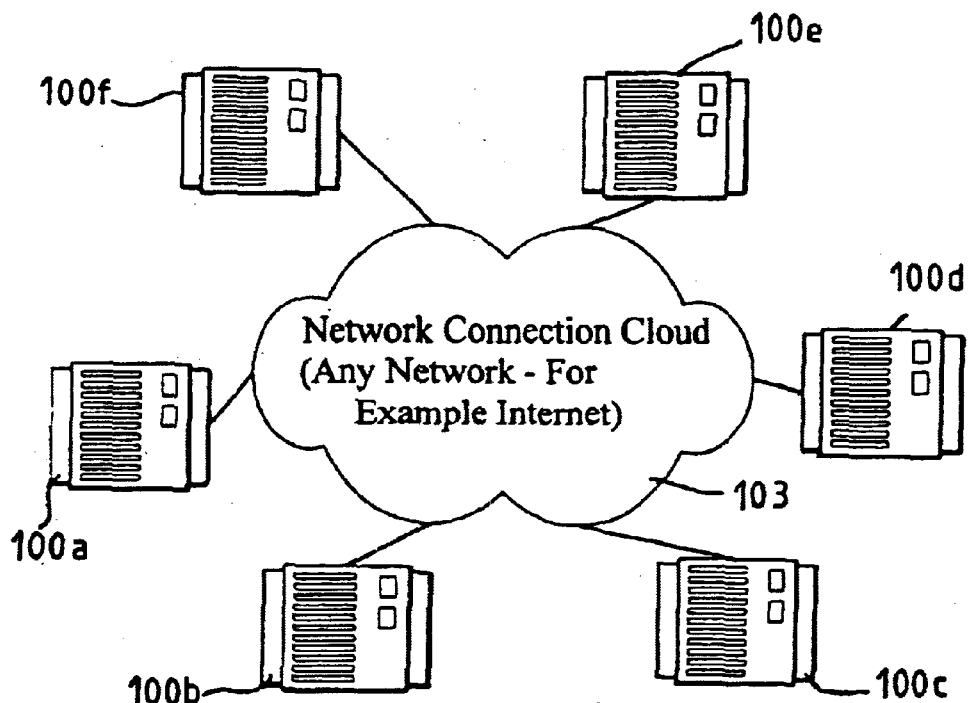
FIG. 2 is a schematic diagram of the unified message system according to the present invention.
Figure 3:
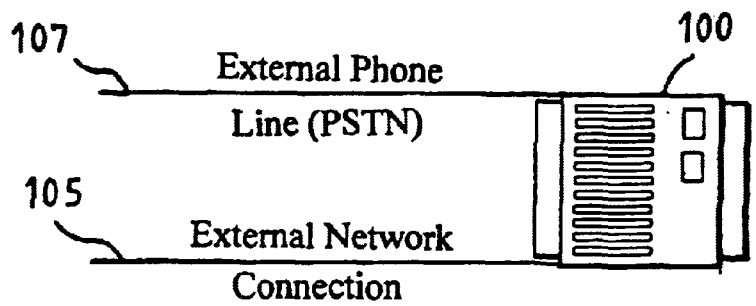
FIG. 3 illustrates a single node of the system of FIG. 2.

Each component node is one separate device i.e. all communications, Internet and Network functionality is contained in one unit, each node being a single physical entity. As shown in FIG. 3, each node has two input/output connections, the external network connection 105 and the external telephone connection 107.

This is different to the traditional unified messaging system in which the system is connected to a separate PBX that is it cannot directly take a phone trunk as an input.

The user functionality of the unified messaging system of the present invention will now be described in detail to aid the reader, the following definitions are provided:

The term "internal users" is defined as users who have accounts on the unified messaging system of the present invention. These users are maintained on an internal database. Details stored include names, e-mail addresses, phone numbers, pager numbers, wireless device numbers, fax numbers etc.; and The term "external users" is used to define those users who do not have an account on the system. When messages are moved about the system, if they originate from external sources, then they will be delivered out of the system by one of the nodes.

The user functionality of the unified messaging system of the present invention can be considered with reference to the following six categories:

Receiving Messages: The methods by which messages and communication enters the system. Once the messages are taken they are put into the central In-box awaiting the user collection.

Collecting Messages: The methods by which messages are retrieved from the central In-box.

Sending Messages: The methods by which the user can send their own messages. This can be in the form of a reply to an incoming message or the initiation of a new message for sending.

Message Broadcasting: This functionality which lets the user broadcast the same message to a list of users.

Telecommunications Functionality: Those features which let conference phone calls take place and allow for live telephone calls to be routed.

Intelligent Agents: Components whose function is to control the routing, timing, priority and delivery of the above constructs.

The user can receive messages via any of the nodes of the unified messaging system of the present invention by voicemail message, fax message, e-mail message, web response message, phone answering message, SMS and other wireless "short message service" based message, notification message, system message, video-mail message and white board message.

Once the messages are received they are stored in the user's In-box. The In-box to the user has one central location, i.e. one location logically. The Actual In-box has the messages and components spread over the distributed node based system, physically distributed.

The types of incoming messages which can potentially be supported by the system of the present invention are detailed below.

For voicemail messages, each user is assigned a unique phone number on each node they subscribe to. This phone number acts as a unique identifier for calls coming in. In this way, incoming calls are matched to the appropriate user. The phone line, T1, E1, (Analog protocols) connect directly to the node, and no PABX or switchboard is required. The line rings over a phone and the unique phone number of the users are passed through the same line to the node using DDI, DID standards. The call is then answered by the VP node and the voicemail is taken. It is then stored in the user's In-box awaiting retrieval. The storage is typically in the WAV, VOX, VPIM or Real Audio formats.

Fax messages can be received on the same phone numbers described above. The numbers can be programmed to receive faxes only, voicemails only or auto-detect (receiving both fax and voice communications from one number). The same connection methods are used as above. The call is then answered by the VP node and the fax is taken. It is then stored in the user's In-box awaiting retrieval. The storage is typically in the TIFF or JPG formats.

E-mail messages arrive via the computer network connection. Many E-mail protocols are supportable for example, SMTP, MAPI, POP3, MHS, X400. E-mail messages are stored as text messages in the In-box.

Each user of the system of the present invention has by default a web page automatically generated. This means that messages can be sent from a web page i.e. an Internet or Intranet user can visit the users unique web page and leave a message. A standard web browser is all that is required to leave such a message as the message sending mechanisms are embedded in the HTML code which display and send the page. Messages are stored as text messages in the In-box.

The user at any node can also divert their allocated phone number(s) to an external telephone answering bureau. The bureau uses a standard web based input mechanism similar to the web response to enter a message as dictated by the caller. Messages are then sent by the bureau into the node over, for example, an Internet link and stored as text messages in the In-box.

SMS messages are sent via mobile/cellular phones and other wireless devices. These messages are typically short and are stored as text messages in the In-box.

Notification messages are not received from external sources but are internally generated by the system. These are created if a rule set in the intelligent agent is activated to notify a user if a message of any type is left. Notification messages are stored in the In-box as text messages.

System messages are not received from external sources but are internally generated by the system. They are created when the user has to be informed of a system event, for example, "message box full" or "system will be found from 5 am–5:30am". System messages are stored in the In-box as text messages.

Video-mail messages are similar to voicemail messages except that they play video and sound clips instead of sound clips only. Messages are received on the node via a unique identifier address which identifies them for the particular user. Messages are stored as video-mail messages in the In-box, and example standard of storage is MPEG or AVL.

White board messages are free form diagrams which a user program is able to create from a support white board software package using familiar software graphics manipulation tools such as pencil, fill and paint. The messages are snapshots in time from when they were sent. White board messages are received on the node via unique identifier address which identifies them for the particular user and are stored as images in the In-box for example, TIFF or JPEG formats.

Once the user has received one or more of the messages described in the above section they are deposited in the user's In-box. They must now be collected. There are two categories of message collection—Push and Pull. A Push collection method involves the message being pushed out at the control of the In-box intelligent routing agents. A Pull collection method involves the user connecting to the In-box and manually requesting the messages.

Messages can be collect by phone by calling any node. This involves a "Gateway Collection" number which rings on the node machine hardware. An account and PIN number is then entered and messages are retrieved via a voice menu system. Where the node based unified messaging system of the present invention differs from that of the traditional systems is that the user can call any node. These nodes of course can be located anywhere in the world and are all connected via the network connection. The types of messages which can be retrieved over the phone are:

voicemail in which the voice recording file is simply played;

e-mail, whereby a text to speech engine is employed which enables a computer generated voice to read text;

fax an Optical Character Recognition engine enables the system to "read the words on the page" before being passed to a Text to Speech engine;

phone answering messages in which a text to speech engine is used;

web response messages a text to speech engine is used;

SMS and wireless messages text to speech engine is used;

notification messages a text to speech engine is used; and system messages, a text to speech engine is used.

Messages can be collected by the Internet World Wide Web interface from any Internet terminal with a WWW browser. This involves entering the web address and then entering an account log-on-detail, and password. Once authenticated the user is presented with a view of their In-box in graphical form. The unified messaging systems of the present invention differs from that of the traditional system in that the user is presented with a centralized common view of their In-box, a logical view, although the individual messages can be physically located on any node in the network. All message types can be retrieved over the Web Site collection method. These include:

voicemail, the voicemail recording file simply played by the browser through the speakers attached to the Internet terminal device. The file is typically in WAV or Real Audio format;

e-mail, the text is simply displayed on the screen;

fax, the graphic representation of the message is simply displayed on the screen of the Internet device. This is typically in JPG or TIFF format;

phone answering messages, the text is simply displayed on the screen;

web response messages, the text is simply displayed on the screen;

SMS and wireless messages, the text is simply displayed on the screen;

notification messages, the text is simply displayed on the screen;

system messages, the text is simply displayed on the screen;

video-mail, the video-mail recording file simply played by the browser through the screen and speakers attached to the Internet terminal device. The file is typically in MPG or AVI format; and white board message, the graphics representation of the message is simply displayed on the screen of the Internet device. This is typically in JPG or TIFF format.

Messages can be collected by a client specific program. This piece of software must be installed on a computer or PDA/Hand-held organizer system, for example, Windows, Unix, Macintosh, Windows Ce, Palm Pilot, Psion, WAP, HDML compliant device. To access the node, the client computer must be connected to the node over a network, for example, the Internet. The client program then communicates over the network, typically TCP/IP protocol with any node to retrieve messages. Once authenticated, the user is presented with a view of their In-box in graphical form. The way in which this differs from that of traditional systems is that the user is presented with a centralized common view of the In-box, a logical view, although the individual messages can be physically located on any node in the network. All message types can be retrieved over the Web Site collection method as listed above.

The above are all examples of Pull collection methods.

Messages can be collected by the user as the result of a fax being sent to them on any node, typically the closest one to cut down on long distance fax charges. The fax out can be initiated by a phone call and a "download" of faxes to the nearest machine, pull method. Faxes can also be pushed out at a time set by the intelligent routing agents. These nodes of course can be located anywhere in the world and are all connected via the network connection. The types of messages which can be retrieved by being faxed out are:

e-mail, in which the text is displayed on the fax page;

fax, in which the fax image is represented and displayed on the fax page;

phone answering messages, the text is displayed on the fax page;

web response messages, the text is displayed on the fax page;

SMS and wireless messages, the text is displayed on the fax page;

notification messages, the text is displayed on the fax page;

system messages, the text is displayed on the fax page; and white board message, the text is displayed on the fax page.

Messages can be collected by the user as the result of an e-mail being sent to them on an external e-mail address. E-mail messages are sent out according to the rule set currently set in the intelligent agent. E-mails can be sent from any of the nodes. The types of messages which can be retrieved by being E-mailed out are:

voicemail, the voicemail is stored as an attached file to the e-mail for example, WAV, real Audio or VPIM format. It can then be played back through the speaker of the machine reading the e-mail;

e-mail, the text is contained within the e-mail;

fax, the graphic representation of the messages is attached to the e-mail.

This is typically in JPG or TIFF format. This can be ready by the machine reading the e-mail with an in-built or external viewer;

phone answering messages, the text of the message is included in the e-mail;

web response messages, the text-of the message is included in the e-mail;

SMS and wireless messages, the text of the message is included in the e-mail;

notification messages, the text of the message is included in the e-mail;

system messages, the text of the message is included in the e-mail;

video-mail, the graphics representation of the message is attached to the e-mail.

This is typically in AVI or MPEG format. This can be read by the machine reading the e-mail with an in-built or external viewer; and white board message, the graphics representation of the message is attached to the e-mail. This is typically in JPG or TIFF format. This can be read by the machine reading the e-mail with an in-built or external viewer.

Messages can be collected by being sent to the user's pager or text descriptive mail receiving system. Pager messages are sent out according to the rule set currently set in the intelligent agent. Pager type messages can be sent from any of the nodes. The types of messages which can be retrieved by being sent out via pager are short text message types such as:

e-mail, the text is contained within the Pager message;

phone answering messages, the text is contained within the Pager message;

web response messages, the text is contained within the Pager message;

SMS and wireless messages, the text is contained within the Pager message;

notification messages, the text is contained within the Pager message; and system messages, the text is contained within the Pager message.

E-mail collection and pager or wireless short message system collection methods are examples of push collection methods.

As well as dealing with the sending and receiving of messages, the unified messaging system of the present invention, the user can also initiate the sending of their own messages via the system. These messages can be constructed from scratch or they can be reply messages in this case an incoming message body is included in the body of the out going message in a form that can be edited and further commented on. The following types of user interface device can be connected to the unified messaging node and can be used to send messages:

via a Web Interface. In this case, the user connects to the node via a standard Web browser which can be running a PC computer, Web TV device, PDA, or Web Capable Wireless device;

via a telephone. This case the user connects to the node by ringing a gateway number. The user is then prompted to leave a message via a hierarchical system of menu prompts; and via a Client specific program. In this case, the software for this program must be installed. This can be installed on a PC Computer or PDA/hand-held organizer system, for example Windows, Unix, Macintosh, Windows CE, Palm Pilot, Psion.

When attached to a node for the purpose of sending a message there are several types which can be constructed:

a text based message, e-mail, SMS message, Pager message;

an image based message, fax or white board note;

a sound recording based message, voicemail recording; and a video based message, video-mail recording.

When the message composition is finished it can be sent from the node and delivered to the recipient. The recipient can either be an Internal User or External User. In the case of an internal user, the message is sent over internal system transport mechanisms to the internal user's In-box. It is then treated as an any other incoming message as described above. In the case of an external user, the message is sent over the transport mechanisms of the nodes and then delivered via an external gateway on one of the nodes. The gateway is able to send the message out to an external communication method, for example, Internet e-mail, public telephone system, to a fax machine, to a video device.

Another form of functionality is that of broadcasting messages. This is similar to sending messages except that instead of the message being sent to one recipient it is sent to many. The same input and sending methods are used above except when the message is constructed they are sent to a list of users. This list of users can be maintained in the address book described below.

Some extra functionality built into the system but not part of the core functionality is the telecommunications functions. These are as follows.

One of the functions of the unified messaging system of the present invention is the ability to initiate a conference call from one of the user interfaces described above via telephone, web client or program client. The user enters in both the number of the telephone they are closest to and the telephone numbers of the other members of the conference. This conference request is then passed to one node. The node then makes standard out going telephone calls to all conference parties. Once all have answered then the node patches all calls together. These calls are made over the standard PSTN telephone network.

A "follow me" function can also be built into each node. As described above, each user is allocated a unique telephone number, which is provided over a telephone line which terminates onto the telephone connection port of a node. This number is used to receive voicemail, faxes or can be diverted to a live telephone answering bureau. Another option is that any call coming into that line can be diverted to any other telephone number.

This forms a re-routably number. For example, a user could have a number 345 6789 which terminates and rings on a node. When this number rings, the node is programmed to not answer the call but route it to any number in the world available over the PSTN public telephone network.

The purpose of the intelligent agents is to aid the user in the management of their messages. With the system of the present invention routing, arrival, sending and collection of messages can become a complicated task. The intelligent agent is user configurable component.

The agent defines a set of rules and actions. If a condition of the rule is set then an action is performed. Rules and actions can be combined and logic applied.

The rules that can be applied are functions of the message parameters, i.e. message size in bytes, message type, message destination, message destination contains "X", total message contained within In-box, message sender; message sender contains "X", message arrival time, message priority, message subject contains "X", time is before and time is after.

The rules can be applied at the points of on message arrival at User's In-box, and on sending the message.

If the rules are met then the following actions can take place; move message to In-box-folder X, delete message and send message to push sender X.

The following are some examples of uses of the above:

| Rule and Action | What it actually Does |
| --- | --- |
| "On Message arrival at User's In-box If Message Type = "Voicemail" Send Message to Push Sender E-Mail" | Routes incoming Voicemail to an External E-mail address |
| On Entering the User's In-box If Message Sender = "Joe" Move Message to In-box - Folder "Joe" | Moves all Messages from Joe (he is defined in the user's address book) to a special folder called Joe |
| On Sending the Message If Message Priority is "High" & Message Type is "E-mail" Send Message to Push Sender Pager | Sends all high priority E-mails to a pager as well as the default E-mail. If no pager address for that user exists in the message of course does not get sent |

Therefore, unlike traditional unified messaging systems, the messaging system of the present invention does not work a single system but comprises a plurality of nodes which work together in a distributed system. Network connections are used to input and output messages as on the traditional system as well as performing distributed operation and inter-nodal control. The traditional unified messaging system requires connection to a telephone switchboard or PABX for the input and output of the telephone-based messages. In the system of the present invention the telephone connection is made directly into the node without any external telecommunication based equipment being required. The system of the present invention can provide a remote integrated message learning option. This remote node receives a message in a different location to the user, allowing for a "virtual branen office" which is a telephone number which can receive faxes, voicemail etc. in a totally remote city. For example, the user is based in London and has a virtual branch office in Hong Kong. Callers in Hong Kong contact the user via the local Hong Kong telephone number instead of making an international call. The message then enters the common unified messaging system to be accessed by the user in London. Such a remote message leaving option would not be possible on the traditional system.

The user can also access any message from any node since the node work together as one system. This can be achieved with the same interface. For example, a user uses a London based node. While away in Los Angeles, say, the user can call a Los Angeles based node at local call rate to retrieve all his messages.

Typically, the traditional system can integrate voicemail, fax and e-mail message type. However, the messaging system of the present invention can integrate a variety of message types which utilize any form of media which can be encapsulated within a computer file, for example, voice mail, fax, e-mail, video-mail and white board note.

Since the system of the present invention is based on a distributed system, it can provide work group features such as shared calendars, to do lists, shared address books, meeting request tools and file sharing capabilities. These can all be integrated with the messaging components. Such a facility can be provided for on the traditional messaging system.

Invariably, users can only receive messages with the traditional unified messaging system whereas the system of the present invention enable the user to send messages.

Each node has the following Technical Specifications.
PSTN Compatibility:
  Primary Rate ISDN:
  T1: Robbed bit signalling
  Framing: D4, ESF
  Coding: AMI, B8ZS
  ISDN Support: Q.920, Q.921, Q.922, Q.930, Q.931
LAN Interface:
  Ethernet 10/100 Base-T
  Protocols TCP/IP (Internet), IPX, Netbuei
Data Protocols:
  300 to 33,600 bps full duplex
  56,000 bps receive/33,500 bps send
  V.34bis, V.34, V.32bis, V.32, V.22bis, V.22
Fax Protocols:
  Group 3 up to 9.6 kbs
  V.29, V.17, V.27ter, T.30
Telephony Support:
  DTMF/MF
Voice Support:
  WAV, VOX, GSM
Video Support:
  MPEG
  AVI
  H323
Module:
  Keyboard and Monitor Ports
Operating Environment:
  Operating Temperature: 0 to 45° C., internal ambient
  Storage Temperature: −10 to 70° C.
Regulatory Compliance:
  PUL/UL Canada
  UK Oftel
  FCC Certified Class A The present invention has been described above purely by way of example, and modifications can be made within the spirit of the invention. The invention also consists in any individual features described or implicit herein or shown or implicit in the drawings or any combination of such features or any generalization of any such features or combination.

What is claimed is:

1. A unified messaging system, comprising a plurality of nodes and network means for interconnecting said plurality of nodes for distributed operation, each node comprising means for receiving, storing and transmitting data, characterized in that an In-box having a predetermined logical location is reserved for each user, and data intended for a particular user is stored at the node at which it is received together with information indicating the logical location of the In-box of the user for which the data is intended, wherein said data comprises messages of different format types and a particular subset of said format types can be retrieved at one or more other nodes in the system and all data bearing said predetermined logical location information is accessed using a particular communication access type when said user's In-box is accessed.

2. A messaging system according to claim 1, wherein at least one of said nodes includes means for changing the format of said data.

3. A messaging system according to claim 1 or claim 2, wherein at least one of said nodes has a plurality of input/output connections.

4. A messaging system according to claim 3, wherein one of said input/output connections is an external telephone connection and another of said input/output connections is an external network connection.

5. A messaging system according to claim 1, wherein said data is one or more of a voicemail message, fax message, e-mail message, web response message, phone answering message, short message service (SMS) message, notification message, system message, video-mail message, white board message.

6. A messaging system according to claim 1, wherein the system is arranged to provide a menu indicating data bearing said predetermined logical location information when a user's respective In-box is accessed.

7. A messaging system according to claim 6, wherein said menu is a voice menu.

8. A messaging system according to claim 6, wherein said menu is displayed on a screen.

9. A messaging system according to claim 2, wherein at least one of said plurality of nodes includes means for converting text data into speech data.

10. A messaging system according to claim 2, wherein at least one of said plurality of nodes includes character recognition means.

11. A messaging system according to claim 1, arranged wherein data is retrieved from a first node and transmitted to a second node when said first node receives a signal from said second node.

12. A messaging system according to claim 1, arranged wherein data is transmitted from a first node to a second node at a predetermined time set by the system.

13. A messaging system according to claim 1, wherein said nodes are interconnected by means of an Internet-based network.

14. A messaging system according to claim 1, wherein at least one of said plurality of nodes comprises means for diverting incoming data to another one of said plurality of nodes.

15. A messaging system according to claim 1, wherein at least one of said plurality of nodes comprises user-activated means for diverting incoming data to another one of said plurality of nodes.

16. A messaging system according to claim 1, wherein data intended for a particular user is stored directly at the node at which it is received.

17. A unified messaging system, comprising a plurality of nodes and network means for interconnecting said plurality of nodes for distributed operation, each node comprising means for receiving, storing and transmitting data, characterized in that an In-box having a predetermined logical location is reserved for each user, and data intended for a particular user is stored at the node at which it is received together with information indicating the logical location of the In-box of the user for which the data is intended, wherein said data comprises messages of different format types and a particular subset of said format types can be retrieved at one or more other nodes in the system and all data bearing said predetermined logical location information is accessed using a particular communication access type when said user's In-box is accessed, wherein said nodes are interconnected by means of an Internet-based network.

* * * * *

UNITED STATES PATENT AND TRADEMARK OFFICE
CERTIFICATE OF CORRECTION

PATENT NO. : 6,721,398 B1
DATED : April 13, 2004
INVENTOR(S) : John Pitcher

It is certified that error appears in the above-identified patent and that said Letters Patent is hereby corrected as shown below:

<u>Title page,</u>
Item [73], Assignee, "Virtuaplus Limited" should be -- Virtualplus Limited --.

Signed and Sealed this

Tenth Day of August, 2004

JON W. DUDAS
*Acting Director of the United States Patent and Trademark Office*